United States Patent [19]
Nakatani et al.

[11] Patent Number: 5,701,982
[45] Date of Patent: Dec. 30, 1997

[54] LOCKUP CONTROL SYSTEM FOR AUTOMATIC TRANSMISSION

[75] Inventors: Kazushi Nakatani; Akira Takagi, both of Obu; Hajime Yokoyama, Toyota, all of Japan

[73] Assignee: Nippondenso Co., Ltd., Kariya, Japan

[21] Appl. No.: 500,367

[22] Filed: Jul. 10, 1995

[30] Foreign Application Priority Data

Jul. 11, 1994 [JP] Japan ................................ 6-158455
Mar. 14, 1995 [JP] Japan ................................ 7-054023

[51] Int. Cl.$^6$ ................................................ F16H 61/14
[52] U.S. Cl. ........................ 192/3.3; 477/168; 74/732.1
[58] Field of Search ........................ 192/3.29, 3.3; 477/166, 168; 74/732.1

[56] References Cited

U.S. PATENT DOCUMENTS

| | | | |
|---|---|---|---|
| 4,588,059 | 5/1986 | Miki et al. | |
| 4,664,235 | 5/1987 | Yokoyama et al. | 192/3.29 |
| 4,989,702 | 2/1991 | Yoshimura et al. | 192/3.29 |
| 5,082,095 | 1/1992 | Imamura | 192/3.3 |
| 5,090,527 | 2/1992 | Imamura et al. | 192/3.3 X |
| 5,152,386 | 10/1992 | Imamura | 192/3.3 X |
| 5,226,513 | 7/1993 | Shibayama | 192/3.3 X |
| 5,305,862 | 4/1994 | Gierer | 192/3.3 |

FOREIGN PATENT DOCUMENTS

| | | |
|---|---|---|
| 452887 | 10/1991 | European Pat. Off. . |
| 564017 | 10/1993 | European Pat. Off. . |
| 2304260 | 12/1990 | Japan . |
| 5263919 | 10/1993 | Japan . |
| 6 5101 | 1/1994 | Japan . |
| 2115505 | 9/1983 | United Kingdom . |

*Primary Examiner*—Charles A. Marmor
*Assistant Examiner*—Saul J. Rodriguez
*Attorney, Agent, or Firm*—Cushman, Darby & Cushman IP Group of Pillsbury Madison & Sutro LLP

[57] ABSTRACT

A lockup control system for an automatic transmission is provided with an electromagnetic valve 11 and a spool valve 13. When the electromagnetic valve 11 is inactive, the spool valve 13 is set so that a pressure at an OFF port 171 of a torque converter 12 is higher than that of an ON port 172, thereby opening a lockup clutch mechanism 19. When the electromagnetic valve 11 is activated, its control pressure Pc becomes lower than a secondary pressure PL2 and the spool valve 13 is actuated so that the control pressure Pc is supplied to a clutch control chamber 18. As a result, the lockup clutch mechanism 19 is closed, thereby setting the lockup state. At this time, the control pressure Pc acts directly on the clutch control oil chamber 18, so that the lockup clutch mechanism 19 is controlled with high precision.

14 Claims, 6 Drawing Sheets

LOCKUP CONTROL SYSTEM FOR AUTOMATIC TRANSMISSION

CROSS REFERENCE TO RELATED APPLICATION

This application is based upon and claims priority from Japanese Patent Applications No. Hei. 6-158455 filed Jul. 11, 1994, and No. Hei. 7-54023 filed May 14, 1995, the contents of which are incorporated herein by reference.

BACKGROUND OF THE INVENTION

1. Field of the Invention

The present invention relates to a lockup control system for an automatic transmission for transmitting a motive power through a fluid.

2. Description of Related Art

Known automatic transmissions for linking an engine with an axle of a car are typically composed of a fluid joint, constituting a power transmission mechanism such as a torque converter, and a gear change mechanism for varying transmitted engine speeds. Because the torque converter is constructed so as to transmit motive power through a fluid such as oil, it causes a slip in transmitting the power. Because such a slip phenomenon directly affects fuel consumption and other factors, a lockup clutch mechanism for directly linking an input shaft with an output shaft is provided in such a torque converter.

A lockup control system in such automatic transmissions is disclosed in Japanese Patent Laid-Open No. Hei. 5-263919, for example. The system disclosed therein is provided with a lockup control solenoid and regulates hydraulic pressure for controlling a lockup clutch by determining the position of a spool valve (an opening area of the spool) from a hydraulic pressure output by the solenoid. Due to that, the control hydraulic pressure can be regulated only with an accuracy obtained by multiplying the accuracy of the output pressure of the solenoid with a certain gain, so there is a possibility that the accuracy for controlling the lockup clutch suffers.

A lockup clutch control system disclosed in Japanese Patent Laid-Open No. Hei. 2-304260 regulates the hydraulic pressure for controlling the lockup clutch directly by a lockup control solenoid. It requires, however, another solenoid to operate the spool value for causing a lockup control hydraulic chamber to communicate with the solenoid, thus complicating the structure.

Another lockup control system in automatic transmissions disclosed in Japanese Patent Publication No. Hei. 6-5101, for example. The lockup control system therein comprises a lockup control valve for supplying/discharging pressure oil to/from a fluid transmission mechanism for engaging/ releasing a lockup clutch, a lockup signaling valve for supplying/discharging pressure oil to operate the lockup control valve and a lockup electromagnetic solenoid valve for electrically controlling the supply/discharge of the pressure oil to the lockup signaling valve in response to vehicle traveling conditions. The lockup signaling valve releases the lockup by the pressure oil supplied when the vehicle is started or when the gear is rapidly shifted down, regardless of the control by means of the lockup electromagnetic solenoid valve, to expand lockup range and to improve fuel consumption.

However, in the lockup control system disclosed in Japanese Patent Publication No. 6-5101 the lockup control valve is controlled by the lockup signaling valve which supplies/ discharges the pressure oil by operating a spool, and the pressure oil supplied to the lockup signaling valve when the vehicle is started or when the gear is rapidly shifted down must be supplied by a shift sequence valve controlled by a hydraulic servo or the like. Due to that, the system structure is complicated and the cost thereof increases.

Although it is conceivable to control the lockup control valve directly by the electromagnetic valve, another problem arises in that a physically large and expensive electromagnetic valve is necessary in order to supply oil of sufficient pressure to control the lockup control valve sharply. This problem seems to be solved by reducing the size of the lockup control valve and by reducing the oil path opening area within the electromagnetic valve so as to assure a pressure regulating precision of the electromagnetic valve. However, the lockup clutch cannot be quickly released when the pressure of the oil controlled by the lockup control valve is reduced due to the reduction of the size of the lockup control valve.

SUMMARY OF THE INVENTION

It is a first object of the present invention to solve the aforementioned problems by providing a lockup control system for an automatic transmission, for linking an engine with an axle shaft of a car for example, which has a simple structure and which can readily assure control accuracy by adapting so that the closed and open states of a lockup clutch mechanism are switched by one control valve mechanism composed of an electromagnetic valve.

It is a second object of the present invention to provide a lockup control system for an automatic transmission in which a size of the control valve is reduced and which allows the lockup state to be released quickly with a simplified structure.

To attain the above first object, in a lockup control system for an automatic transmission of the present invention comprising a lockup clutch mechanism for linking an input shaft with an output shaft by bypassing a fluid joint for transmitting a rotary motive power from the input shaft to the output shaft through a fluid, a control valve for controlling a control hydraulic pressure for switching closed and open states of the lockup clutch mechanism and a directional control valve which is switched between first and second states thereof on the basis of the control hydraulic pressure controlled by the control valve. A first hydraulic path for opening the lockup clutch mechanism is formed in the first state of the directional control valve, a second hydraulic path for closing the lockup clutch mechanism is formed in the second state of the directional control valve. The control hydraulic pressure set by the control valve is supplied to the second hydraulic path for closing the lockup clutch mechanism in the second state of the directional control valve to control the closed state of the lockup clutch mechanism. The control valve sets the control hydraulic pressure for switching the directional control valve to the first state when it is inactive and sets the control hydraulic pressure for switching the directional control valve to the second state when it is active.

According to the lockup control system for the automatic transmission constructed as described above, the directional control valve is driven and switched when an active state of the control valve is switched, and the first hydraulic path for opening the lockup clutch mechanism of the fluid joint is formed by the control hydraulic pressure set when the control valve is inactive. Then, when the control valve is active, the directional control valve is put into the second state, the second hydraulic path for the lockup clutch mechanism is formed, the lockup clutch mechanism is closed and the lockup state is set. Then, when the control hydraulic pressure obtained from the control valve acts directly on the lockup clutch mechanism when the lockup clutch mechanism is closed, the closed state of the lockup clutch mechanism, i.e. the lockup state, may be controlled by the control valve, thus greatly simplifying the structure of the lockup control system.

Furthermore, to attain the above second object, a lockup control system for an automatic transmission according to the present invention comprises:

a fluid joint for transmitting a rotary motive power from an input shaft to an output shaft through a fluid;

a lockup clutch mechanism for linking the input and output shafts by bypassing the fluid joint;

a first directional control valve for supplying/discharging pressure oil for switching closed and open states of the lockup clutch mechanism;

a first control valve for supplying/discharging pressure oil for operating the first directional control valve;

a second directional control valve for switching a communication state in which an oil path which connects the first directional control valve with the first control valve is caused to communicate and a shut-off state in which the oil path is shut off and pressure oil is supplied to the oil path on the side of the first directional control valve to release the clutch mechanism; and a second control valve for supplying/discharging pressure oil for causing the second directional control valve to put into the shut-off state.

According to the lockup control system for the automatic transmission described above, because the second directional control valve switches the communication state in which the oil path which connects the first directional control valve with the first control valve is caused to communicate and the shut-off state in which this oil path is shut off, the lockup clutch mechanism for linking the input and output shafts may be put into the open state regardless of the control state of the first control valve for supplying/ discharging the pressure oil for operating the first directional control valve by controlling the second control valve for supplying/discharging the pressure oil for operating the second directional control valve. Thereby, the present invention has an effect that the lockup state may be released quickly with a simple structure. Further, because the pressure oil for releasing the lockup state quickly is supplied to the first directional control valve by the second directional control valve, the release of the lockup state is not affected even if the first and second control valves are miniaturized. Accordingly, the present invention has an effect that the control valves may be miniaturized.

As the second control valve, a duty-proportional control valve can be applied, whose ON/OFF state is controlled on the basis of the control command sent from the electronic control unit. In this case, the pressure regulating precision of the second control valve may be assured. Thereby, the present invention has an effect that the pressure of the pressure oil supplied to the second directional control valve may be controlled in with high precision.

Furthermore, as the first control valve, a duty-proportional control valve can be applied as well, whose ON/OFF state is controlled on the basis of the control command sent from the electronic control unit. Also in this case, the pressure regulating precision of the first control valve may be assured. Thereby, the present invention has an effect that the pressure of the lockup clutch mechanism may be controlled in with high precision.

Furthermore, as the second directional control valve, a spool valve can be applied. In this case, a spool valve, provided to inhibit the lockup in the first or second speed for example, may be applied. Thereby, the present invention has an effect that parts costs may be lowered the lockup control system may be miniaturized.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
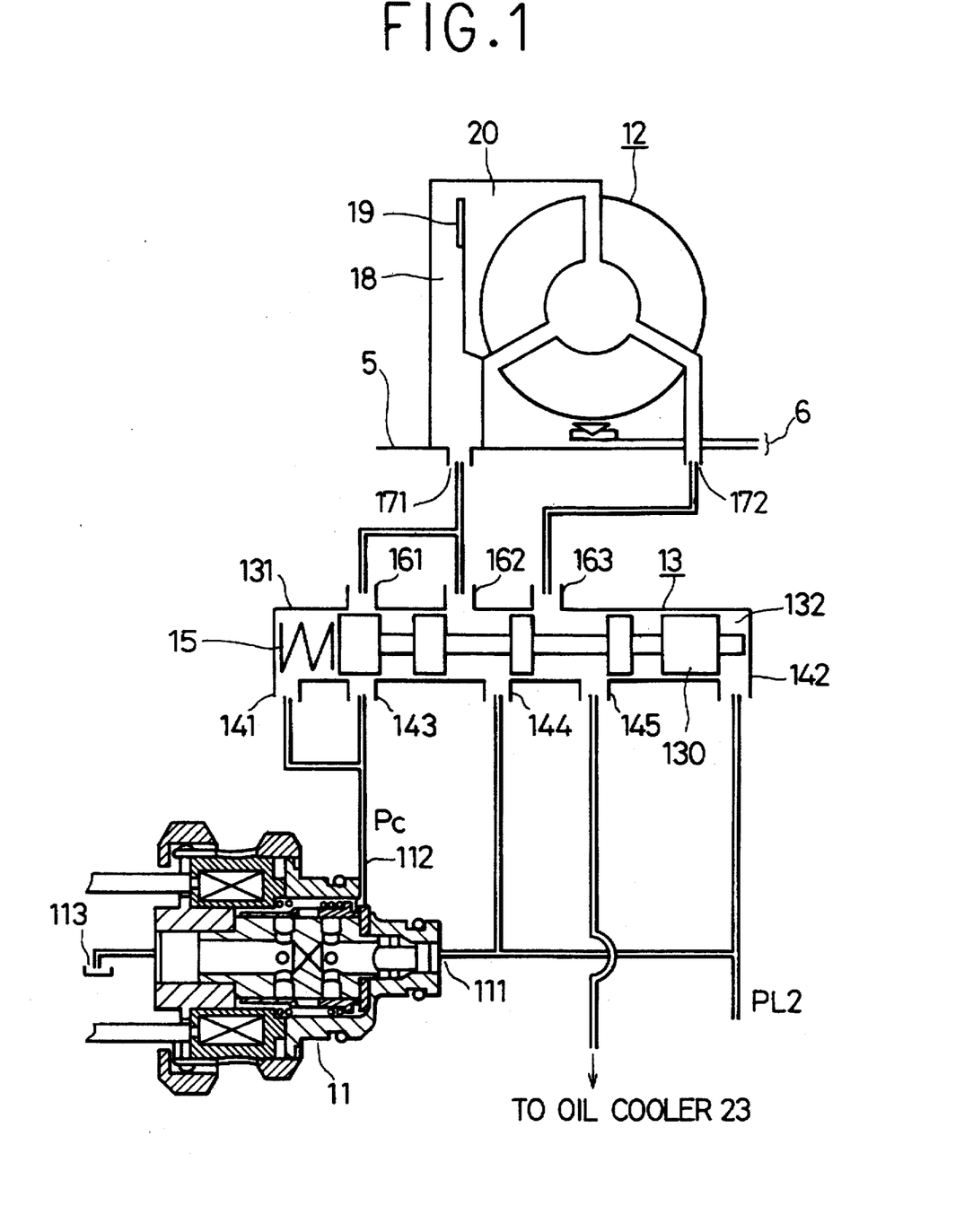
FIG. 1 is a structural diagram for explaining a lockup control system for an automatic transmission according to a first embodiment of the present invention.

The first embodiment of the present invention will be explained below with reference to the drawings. FIG. 1 shows a structure thereof which comprises an electromagnetic valve 11 having one solenoid mechanism. The electromagnetic valve 11 is constructed so that ON/OFF state thereof is controlled on the basis of a lockup control command to a torque converter 12 which constitutes a fluid joint mechanism, i.e. so that an opening thereof is controlled in proportion to a duty. When the electromagnetic valve 11 is not excited, it causes an input hydraulic pressure at an input side port 111 to communicate with an output side port 112, a secondary pressure PL2 set by a regulator (not illustrated) is supplied to the input side port 111 and the secondary pressure PL2 is taken out from the output side port 112 as a control hydraulic pressure Pc to be led to a spool valve 13. When the electromagnetic valve 11 is excited, the output side port 112 communicates with a discharge side drain 113. Then, the control hydraulic pressure Pc at the output side port 112 is set at an arbitrary value in a condition of "Pc<PL2", having a pressure of PL2 at most at the input side port 111, by switching the non-exciting and exciting states of the electromagnetic valve 11 at high speed.

Beside the electromagnetic valve 11, the spool valve 13 which constitutes a directional control valve for controlling the lockup operation is provided. In the spool valve 13, hydraulic chambers 131 and 132 are provided at both ends of a valve 130 and the hydraulic chambers 131 and 132 are provided with ports 141 and 142, respectively. It is constructed so that the valve 130 moves in the right or left direction in the figure in response to a hydraulic pressure set in the hydraulic chamber 131 or 132. The hydraulic chamber 131 is provided with a spring 15 for urging the valve 130 toward the hydraulic chamber 132 (in the right direction in the figure) and the control hydraulic pressure Pc from the electromagnetic valve 11 acts on the hydraulic chamber 131 via the hydraulic path through which the port 141 communicates with the output side port 112.

The secondary pressure PL2, which is equal to the hydraulic pressure supplied to the input side port 111 of the electromagnetic valve 11, communicates with and acts on the hydraulic chamber 132 via the port 142. Accordingly, when the electromagnetic valve 11 is inactive, "Pc=PL2" and internal hydraulic pressures in the hydraulic chamber 131 and the hydraulic chamber 132 are equal, so that the valve 130 is set at the position where it is moved on the right side as shown in the figure by an urging force of the spring 15. Then, when the electromagnetic valve 11 is activated, "Pc<PL2" and a pressure in the hydraulic chamber 132 becomes greater than a sum of a pressure in the hydraulic chamber 131 and the force of the spring 15, so that the valve 130 is moved to the left side of the figure.

The spool valve 13 is provided with a port 143 on which the control hydraulic pressure Pc from the electromagnetic valve 11 acts, a port 144 on which the secondary pressure PL2 acts and a port 145 for supplying discharged oil to an oil cooler (not shown) in addition to the ports 141 and 142 at both ends. It is also provided with ports 161, 162 and 163 which are caused to communicate selectively with the ports 143 through 145 in response to the position of the valve 130 and which communicate with OFF port 171 and ON port 172 of the torque converter 12 to be controlled. In the state of the figure in which the valve 130 is put to the right, the port 144 communicates with the port 162 and the port 145 communicates with the port 163. When the valve 130 is put to the left, on the other hand, the port 143 communicates with the port 161 and the port 144 communicates with the port 163.

The torque converter 12 is provided with the OFF and ON ports 171 and 172. The OFF port 171 communicates with a clutch control oil chamber 18, and a lockup clutch mechanism 19 for setting a lockup state is closed in response to a pressure state of the clutch control oil chamber 18, thereby linking the input and output shafts. In a state when the secondary pressure PL2 acts on the OFF port 171, the lockup clutch mechanism 19 is set at an open state as control oil flows from the clutch control oil chamber 18 to a torque converter oil chamber 20 and is discharged from the ON port 172 to the oil cooler 23 via the spool valve 13.

When the lockup is not activated, no current is fed to an exciting coil of the electromagnetic valve 11 in the automatic transmission constructed as described above. Accordingly, because the input side port 111 and output side port 112 of the electromagnetic valve 11 communicate and "Pc=PL2" in this state, the valve 130 of the spool valve 13 is set at the state in FIG. 1. As a result, the secondary pressure PL2 acts on the OFF port 171 of the torque converter 12 via the ports 144 and 162, the control oil flows from the clutch control oil chamber 18 to the torque converter oil chamber 20, the lockup clutch mechanism 19 is set at the open state, the lockup is put into the inactive state and the link of the input and output shafts 5 and 6 is released.

In activating the lockup, an arbitrary control pressure is set with the relationship of "Pc<PL2" by flowing exciting current intermittently to the solenoid of the electromagnetic valve 11 so as to be duty-controlled.

If the control hydraulic pressure Pc drops here, a spool thrust due to the secondary pressure PL2 acting on the hydraulic chamber 132 of the spool valve 13 becomes greater than a sum of a spool thrust due to the control hydraulic pressure Pc acting on the hydraulic chamber 131 and that of the spring 15, thereby moving the valve 130 in the left direction of the figure. Accordingly, the port 143 communicates with the port 161 and the electromagnetic valve 11 communicates directly with the clutch control oil chamber 18, thereby supplying the control hydraulic pressure Pc to the clutch control oil chamber 18. At the same time, the port 144 of the spool valve 13 communicates with the port 163 and the pressure at the ON port 172 of the torque converter 12 is set at the secondary pressure PL2.

Accordingly, the pressure in the clutch control oil chamber 18 becomes equal to the control hydraulic pressure Pc of the electromagnetic valve 11 in this state and the lockup clutch mechanism 19 is controlled to an intermediate position in response to a difference between the secondary pressure PL2 supplied to the torque converter oil chamber 20 and the control hydraulic pressure Pc supplied to the clutch control oil chamber 18 to implement a control widely known as a slip control. The slip state of the lockup clutch mechanism 19 is controlled on the basis of the control hydraulic pressure Pc controlled by the electromagnetic valve 11. After that, the hydraulic pressure in the clutch control oil chamber 18 is controlled so that the lockup clutch mechanism 19 is completely closed by gradually reducing the control hydraulic pressure Pc of the electromagnetic valve 11.

That is, this automatic transmission is composed of one lockup control electromagnetic valve 11 and one lockup control spool valve 13, and the valve 130 of the spool valve 13 is switched and controlled by the spring 15 and the control hydraulic pressure Pc set by the electromagnetic valve 11. That is, the spool valve 13 for closing the lockup clutch mechanism 19 may be switched and the pressure within the clutch control oil chamber 18 may be regulated when the lockup is activated just by controlling the control hydraulic pressure Pc by controlling the electromagnetic valve 11 and thereby the lockup control in the torque converter 12 constituting the fluid joint may be implemented with high precision.

The current fed to the exciting coil of the electromagnetic valve 11 may be controlled by pulse signals having a specific frequency, for example. Then, the control hydraulic pressure Pc of the lockup clutch mechanism 19 acting on the clutch control oil chamber 18 when the lockup is set may be regulated with high precision and the slip state in the lockup clutch mechanism 19 may be controlled by varying a duty ratio of the pulse signals, thereby enhancing controllability and reliability of the lockup control.

Figure 2:
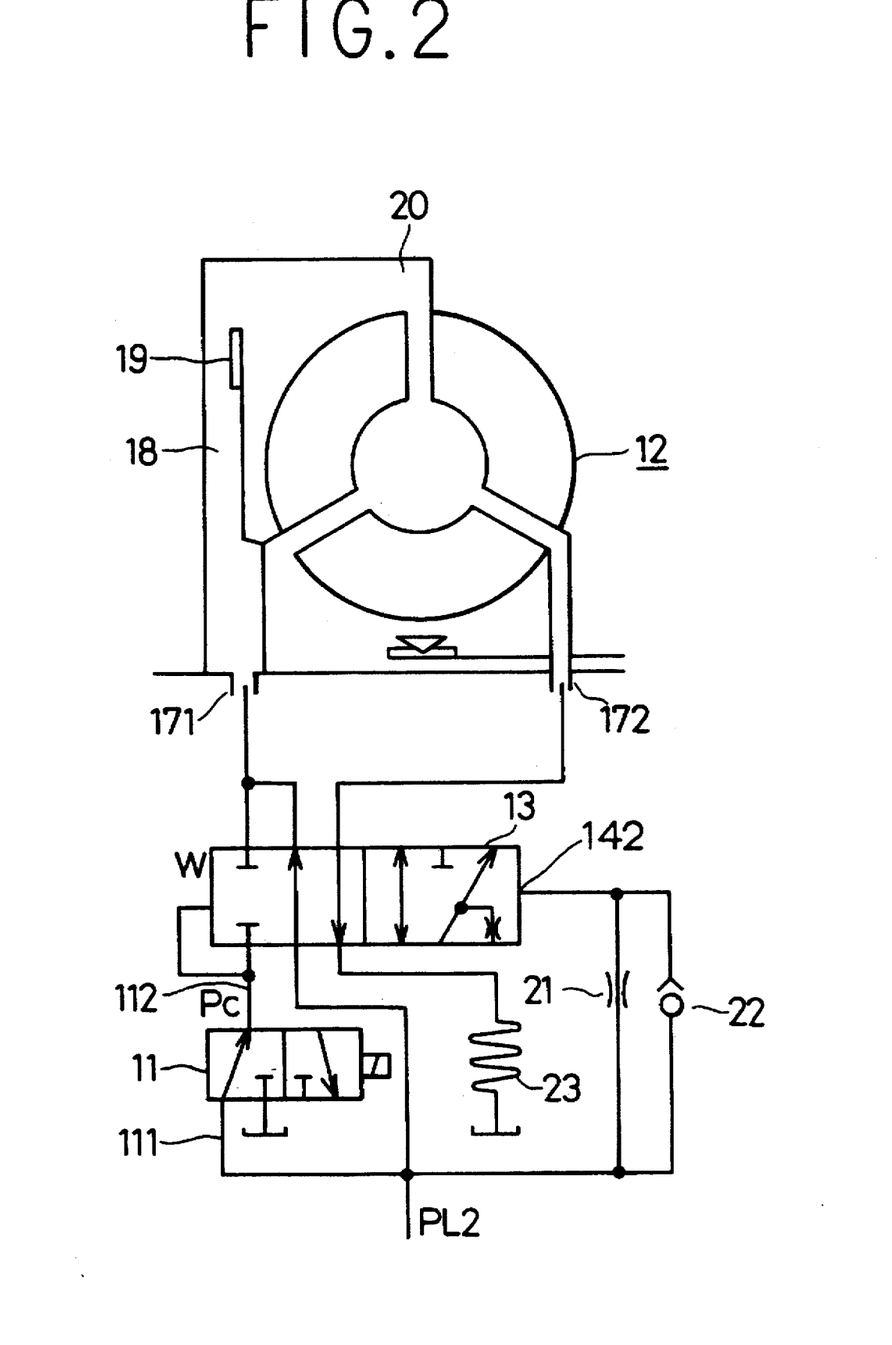
FIG. 2 is a structural diagram for explaining a second embodiment of the present invention.

FIG. 2 is a structural diagram of the second embodiment shown by hydraulic symbols. In the second embodiment, a parallel circuit composed of a restrictor 21 as well as a check valve 22 is interposed between the port 142 communicating with the hydraulic chamber 132 of the spool valve 13 and the pressure source of the secondary pressure PL2. That is, the restrictor 21 suppresses pulsation of the hydraulic pressure caused by the operation of the electromagnetic valve 11 and the check valve 22 improves a responsiveness of the spool valve 13 in transferring from the ON state to OFF state of the lockup control.

Because the clutch control oil chamber 18 is almost concealed in the state when the closing operation is carried out (in the state when the second hydraulic path is formed)

in the normal torque converter, a flow amount of the oil to be controlled may be a very little. Accordingly, a relatively small electromagnetic valve may be used for the electromagnetic valve 11.

As described above, the lockup control system of the automatic transmission of the first and second embodiments are constructed so that the control valve 11 for directing the lockup control regulates the control hydraulic pressure Pc for controlling the lockup clutch mechanism 19 for setting the lockup, and switches the directional control valve 13 as well, at the same time, so that the structure thereof may be simplified and a small and low cost lockup system may be provided. Furthermore, because the control hydraulic pressure Pc of the clutch control oil chamber (18) for closing the lockup clutch mechanism 19 may be regulated directly by the control valve 11, the lockup control may be carried out readily in high precision.

Further, when the control valve 11 is constructed by an electromagnetic valve which is controlled by a duty-control, a restrictor mechanism 21 is provided to prevent a vibration of the directional control valve 13, caused by a pressure pulsation generated in the electromagnetic valve 11 by the intermittent control of exciting current, from occurring, and a check valve 22 is disposed in parallel to the restrictor mechanism 21 to prevent a responsiveness of the directional control valve 13 from dropping by the restrictor mechanism 21. Accordingly, the responsiveness as well as the reliability of the lockup control may be effectively maintained. The third embodiment of the present invention will be explained below with reference to the drawings, FIGS. 3 through 6 show a lockup control system according to the third embodiment of the present invention.

Figure 3:
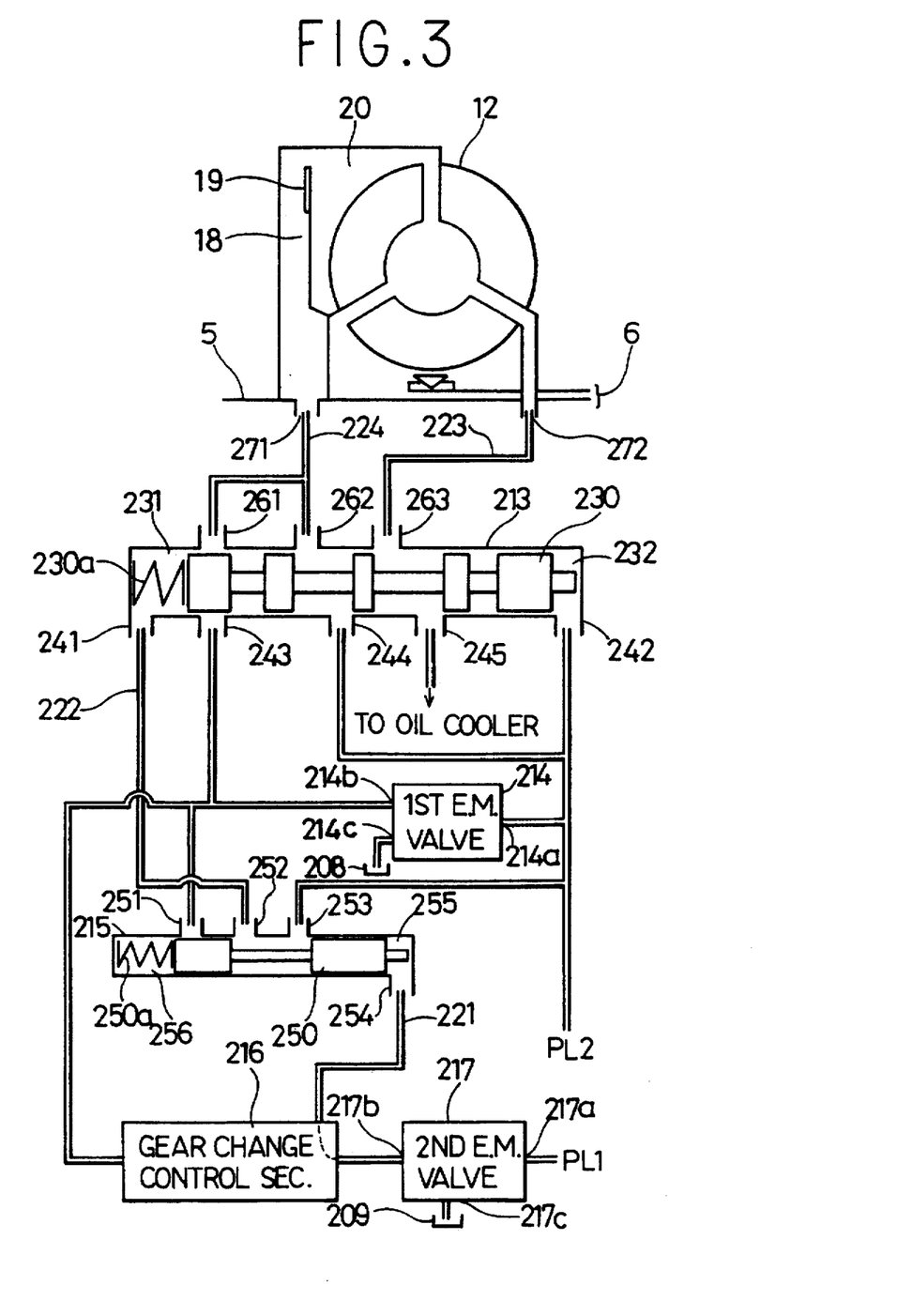
FIG. 3 is a structural diagram of a lockup control system for an automatic transmission according to a third embodiment of the present invention.

As shown in FIG. 3, the lockup control system comprises a lockup switching valve 213, a first electromagnetic valve 214, a switching valve 215, a gear change control section 216 and a second electromagnetic valve 217, and controls a torque converter 12 as a fluid joint mechanism.

The first electromagnetic valve 214 is controlled on the basis of a lockup control command to the torque converter 12 and has a structure in which an average opening of the first electromagnetic valve 214 is controlled in accordance with a ratio of ON time and OFF time, i.e. a structure controllable in proportion to a duty. When it is not excited, i.e. when it is OFF, a port 214a and a port 214b of the first electromagnetic valve 214 communicate, and a communication of the port 214b with a port 214c connected to a drain 208 is shut off. When it is excited, i.e. when it is ON, the port 214b of the first electromagnetic valve 214 communicates with the port 214c connected to the drain 208 and the communication of the port 214a and the port 214b is shut off. That is, a secondary pressure PL2 supplied to the port 214a may be obtained as an arbitrary pressure value from the port 214b by switching the non-exciting and exciting states of the first electromagnetic valve 214 at high speed and by controlling the switching period.

The switching valve 215 has a hydraulic chamber 255 on one side of a valve member 250 and on the other side a spring storage chamber 256 in which a spring 250a for urging in the right direction in FIG. 3 is stored. The hydraulic chamber 255 is provided with a port 254 and is supplied with a line pressure PL1 via the gear change control section 216 and the second electromagnetic valve 217. That is, when a pressure caused by a pressure oil supplied to the hydraulic chamber 255 overcomes the urging force of the spring 250a, the valve member 250 moves in the left direction in FIG. 3. It is then constructed so that a port 251 communicates with a port 252 when the valve member 250 moves in the left direction, and the port 252 communicates with a port 253 when the valve member 250 moves in the right direction. The port 251 is connected with the port 214b of the first electromagnetic valve 214 which communicates with both a port 243 of the lockup switching valve 213 described later and the gear change control section 214. The secondary pressure PL2 acts on the port 253. The port 252 is connected with a port 241 of the lockup switching valve 213 via an oil path 222.

The second electromagnetic valve 217 is controlled on the basis of a lockup control command to the torque converter 12, similarly to the first electromagnetic valve 214. When it is not excited, a port 217a and a port 217b of the second electromagnetic valve 217 communicate and a communication of the port 217b with a port 217c is shut off. When it is excited, the port 217b and the port 217c of the second electromagnetic valve 217 communicate and the communication of the port 217a with the a 217b is shut off. That is, when the second electromagnetic valve 217 is not excited, the line pressure PL1 supplied to the port 217a is obtained from the port 217b and is supplied to the hydraulic chamber 255 of the switching valve 215 via the gear change control section 216 and an oil path 221. Thereby, the valve member 250 in the switching valve 215 moves in the left direction in FIG. 3 and the port 251 communicates with the port 252. When the second electromagnetic valve 217 is excited, the pressure oil within the hydraulic chamber 255 is discharged to a drain 209 via the ports 217b and 217c of the second electromagnetic valve 217, so that the valve member 250 in the switching valve 215 moves in the right direction in FIG. 3 and the port 252 communicates with the port 253.

The lockup switching valve 213 has a hydraulic chamber 231 on one side of a valve member 230 and a hydraulic chamber 232 on the other side. A spring 230a for urging the valve member 230 in the right direction in FIG. 3 is stored within the hydraulic chamber 231. It is constructed so that the hydraulic chamber 231 and the hydraulic chamber 232 are provided with ports 241 and 242, respectively, and the valve member 230 moves in the right or left direction in FIG. 3 in response to a pressure caused by pressure oils supplied to the hydraulic chambers 231 and 232. The port 241 provided at the hydraulic chamber 231 is connected with the port 252 of the switching valve 215 and, on the other hand, the secondary pressure PL2 acts on the hydraulic chamber 232 via the port 242.

As shown in FIG. 3, because the port 252 and the port 253 of the switching valve 215 communicate when the second electromagnetic valve 217 is excited, the secondary pressure PL2 acts on the hydraulic chamber 231 of the lockup switching valve 213 via the switching valve 215, on the oil path 222 and the port 241 of the lockup switching valve 213, as well as on the hydraulic chamber 232 of the lockup switching valve 213. Accordingly, equal hydraulic pressures act on the both ends of the valve member 230 in the lockup switching valve 213 and the valve member 320 moves in the right direction in FIG. 3 by the urging force of the spring 230a. That is, when the second electromagnetic valve 217 is excited, the valve member 230 moves in the right direction in FIG. 3 by the urging force of the spring 230a, regardless of the control state of the first electromagnetic valve 214.

The lockup switching valve 213 is provided with a port 244 on which the secondary pressure PL2 acts, a port 243 to which the secondary pressure PL2 is supplied via the first electromagnetic valve 214 and a port 245 through which the pressure oil is discharged to an oil cooler (not shown), beside the ports 241 and 242 located at the both ends. The lockup switching valve 213 is provided also with ports 261, 262 and 263 which selectively communicate with the ports 243, 244 and 245 in response to a moved position of the valve member 230. In the state shown in FIG. 3 in which the valve member 230 has moved in the right direction, the port 244 communicates with the port 262 and the port 245 communicates with the port 263. In the state when the valve member 230 moves in the left direction, on the other hand, the port 243 communicates with the port 261 and the port 244 communicates with the port 263.

The torque converter 12 is provided with an OFF port 271 and an ON port 272 and a clutch control oil chamber 18 is disposed so as to be continued to the OFF port 271. The OFF port 271 is connected with the ports 261 and 262 of the lockup switching valve 213 by an oil path 224 and the ON port 272 is connected with the port 263 of the lockup switching valve 213 by an oil path 223. A lockup clutch mechanism 19 for setting or releasing a lockup state in response to a pressure state in the clutch control oil chamber 18 caused by the pressure oil supplied from the lockup switching valve 213 is controlled and input and output shafts 5 and 6 are linked when the lockup state is set. When the secondary pressure PL2 acts on the ON port 272, the pressure oil is supplied to the clutch control oil chamber 18 and the lockup clutch mechanism 19 is set at the lockup state, and when the secondary pressure PL2 acts on the OFF port 271, the control oil flows from the clutch control oil chamber 18 to a torque converter oil chamber 20 and the lockup clutch mechanism 19 is released from the lockup state.

Next, operations of the lockup control system will be explained with reference to FIGS. 3 through 6.

When the lockup state is not set, the first electromagnetic valve 214 is put into the non-exciting state and the second electromagnetic valve 217 into the exciting state. In this state, because the port 214a and the port 214b of the first electromagnetic valve 214 communicate and the port 217b and the port 217c of the second electromagnetic valve 217 communicate, the pressure oil within the hydraulic chamber 255 of the switching valve 215 is discharged to, the drain 209 via the second electromagnetic valve 217. Accordingly, the valve member 250 in the switching valve 215 moves in the right direction in FIG. 3 and the port 252 communicates with the port 253. Then, the secondary pressure PL2 acts on the hydraulic chamber 231 of the lockup switching valve 213 via the oil path 222 and equal hydraulic pressures act on both ends of the valve member 230 in the lockup switching valve 213. Accordingly, the valve member 230 in the lockup switching valve 213 is set in the state shown in FIG. 3. As a result, the secondary pressure PL2 acts on the OFF port 271 of the torque converter 12 via the ports 244 and 262 and the pressure oil flows from the clutch control oil chamber 18 to the torque converter oil chamber 20. Thereby, the lockup clutch mechanism 19 is released from the lockup state. That is, the torque converter 12 is put into the non-lockup state.

Figure 4:
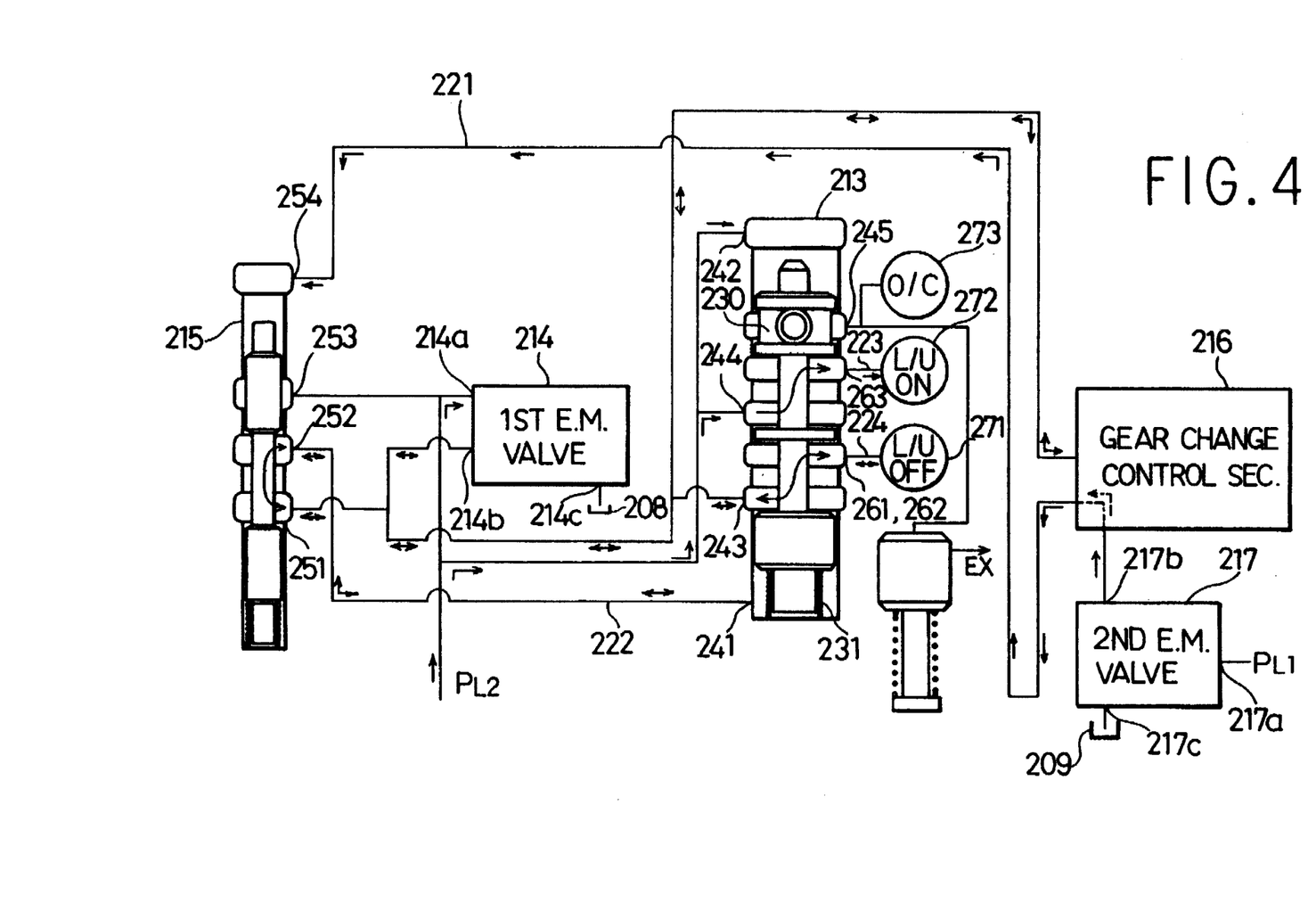
FIG. 4 is a structural diagram for explaining an operation of the lockup control system for the automatic transmission when it is locked up according to the third embodiment of the present invention.

The lockup state is made by putting the second electromagnetic valve 217 into the non-exciting state as well as by controlling the first electromagnetic valve 214 in proportion to a duty as shown in FIG. 4. Because the port 217a and the port 217b of the second electromagnetic valve 217 communicate in this state, the pressure oil supplied from the port 214b of the first electromagnetic valve 214 to be controlled in proportion to the duty flows into the hydraulic chamber 231 of the lockup switching valve 213. That is, an internal pressure of the hydraulic chamber 231 is set arbitrarily while keeping a relationship such that the pressure caused by the pressure oil supplied to the hydraulic chamber 231 of the lockup switching valve 213 is smaller than the secondary pressure PL2. When the internal pressure of the hydraulic chamber 231 drops, an urging force of the secondary pressure PL2 acting on the hydraulic chamber 232 of the lockup switching valve 213 becomes greater than a sum of the urging force of the pressure caused by the pressure oil acting on the hydraulic chamber 231 and the urging force of the spring 230a, and the valve member 230 moves in the lower direction in FIG. 4. Then, because the port 243 of the lockup switching valve 213 communicates with the ports 261 and 262, the pressure oil supplied from the port 214b of the first electromagnetic valve 214 to be controlled in proportion to the duty is supplied to the clutch control oil chamber 18 shown in FIG. 3 via the OFF port 171.

At the same time, because the port 244 and the port 263 of the lockup switching valve 213 communicate, the secondary pressure PL2 acts on the ON port 272 of the torque converter 12. Accordingly, because the pressure within the clutch control oil chamber 18 becomes equal to the pressure caused by the pressure oil supplied from the port 214b of the first electromagnetic valve 214, the lockup clutch mechanism 19 is controlled at an intermediate position in response to a difference with the secondary pressure PL2 supplied to the torque converter oil chamber 20. Thereby, a control widely known as a slip control is made. The slip state of the lockup clutch mechanism 19 is controlled in proportion to the duty of the first electromagnetic valve 214. After controlling the slip, the lockup clutch mechanism 19 is completely closed and the lockup state is made by gradually reducing the pressure caused by the pressure oil from the port 214b of the first electromagnetic valve 214 supplied to the clutch control oil chamber 18.

Figure 5:
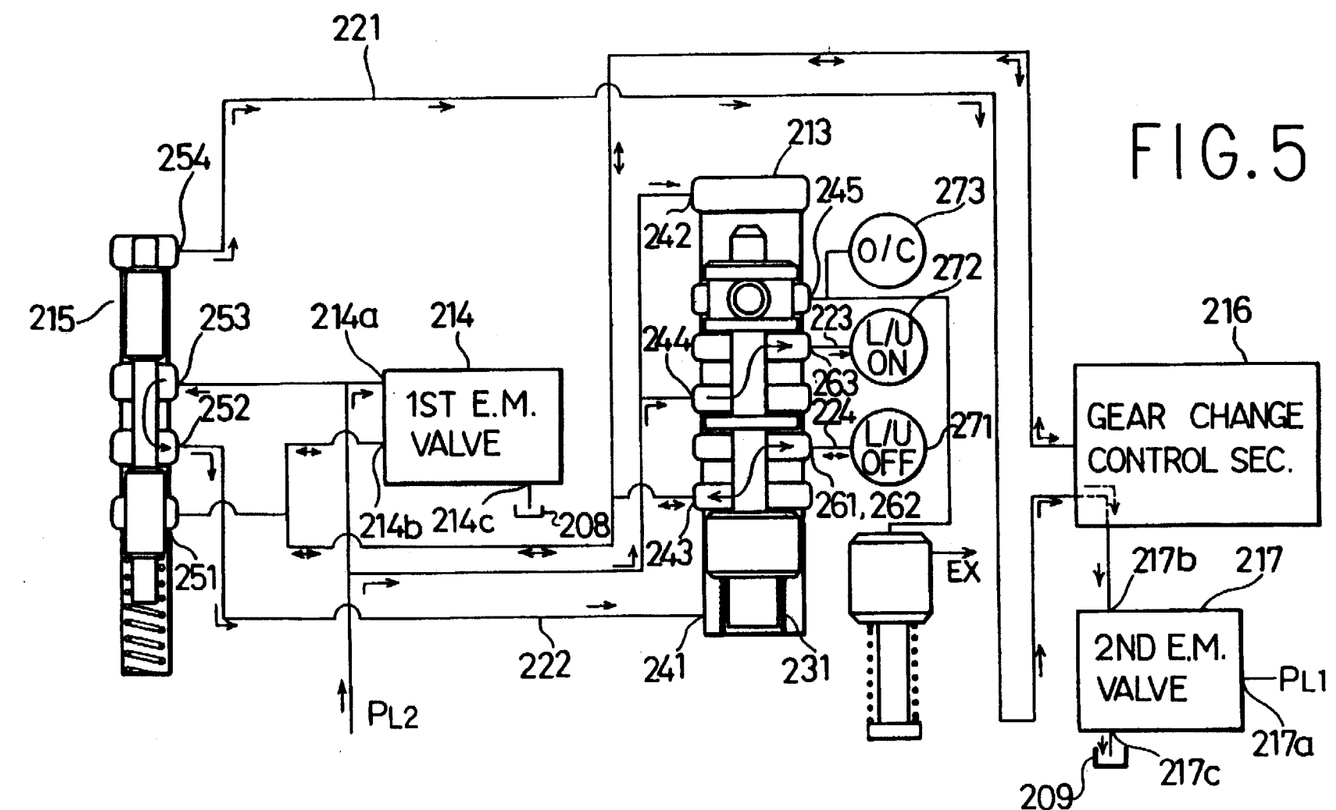
FIG. 5 is a structural diagram for explaining an operation of the lockup control system for the automatic transmission when the lockup is halfway released according to the third embodiment of the present invention.

The lockup state may be rapidly released by exciting the second electromagnetic valve 217 as shown in FIG. 5. Because the port 217b and the port 217c of the second electromagnetic valve 217 communicate in this state, the pressure oil within the hydraulic chamber 255 of the switching valve 215 is discharged to the drain 209 via the second electromagnetic valve 217. Accordingly, the valve member 250 of the switching valve 215 moves in the upper direction in FIG. 5 and the port 252 and the port 253 communicate. Then, the secondary pressure PL2 acts on the hydraulic chamber 231 of the lockup switching valve 213 via the oil path 222 and equal hydraulic pressures act on the both ends of the valve member 230 of the lockup switching valve 213 together with the secondary pressure PL2 acting on the hydraulic chamber 232 via the port 242.

Figure 6:
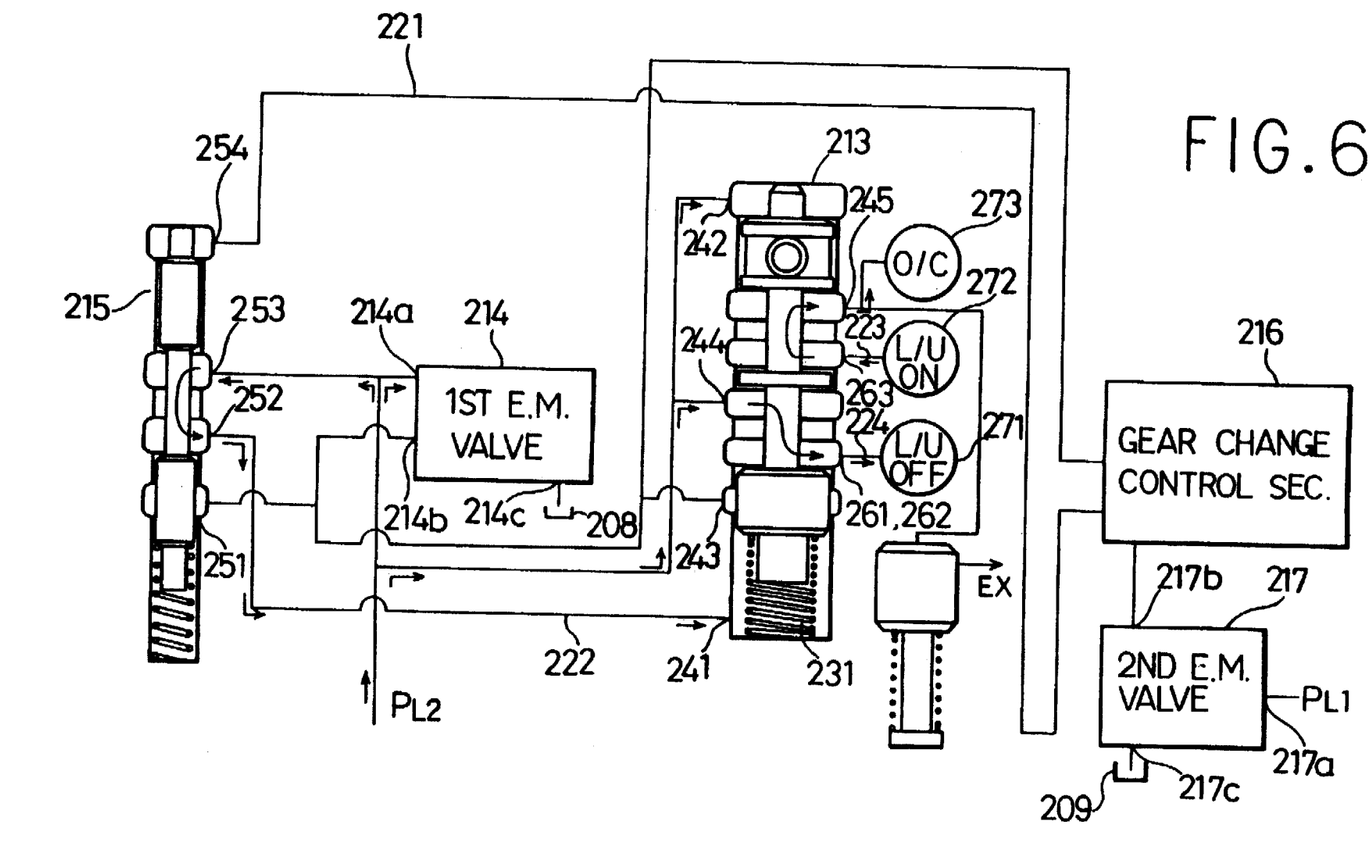
FIG. 6 is a structural diagram for explaining an operation of the lockup control system for the automatic transmission when the lockup is released according to the third embodiment of the present invention.

Accordingly, the valve member 230 moves in the upper direction in FIG. 5, causing the port 244 to communicate with the port 262 and the port 245 to communicate with the port 263 as shown in FIG. 6. Due to that, the secondary pressure PL2 acts on the OFF port 271 of the torque converter 12 via the oil path 224 and the pressure oil flows from the clutch control oil chamber 18 to the torque converter oil chamber 20. Further, the pressure oil supplied to the torque converter oil chamber 20 is discharged to the oil cooler 273 via the ON port 272 of the torque converter 12. Thereby, the clutch mechanism 19 is released rapidly from the lockup state.

The controls of the first electromagnetic valve 214 and the second electromagnetic valve 217 described above are made by means of an electronic control unit not shown.

According to the lockup control system of the first embodiment, the electromagnetic valve 11 is put into the non-exciting state to cause the input side port 111 and the output side port 112 of the electromagnetic valve 11 to communicate, and, to cause the secondary pressure PL2 to act on the hydraulic chamber 131 of the lockup switching valve 13 when the lockup state is released. Due to that, it is necessary to supply a large amount of pressure oil to the hydraulic chamber 131 by enlarging an opening area of oil path within the electromagnetic valve 11 in order to release the lockup state quickly. Accordingly, there may arise a problem that the size of the electromagnetic valve 110 becomes large and a cost of parts increases.

On the other hand, because a sufficient amount of pressure oil, which is supplied to the hydraulic chamber 131 of the lockup switching valve 13, cannot be obtained when the lockup state is released if the oil path opening area within the electromagnetic valve 11 is reduced, the release of the lockup state may be delayed.

As compared to the lockup control system of the first embodiment, the lockup control system of the third embodiment is constructed so that the oil path 222 for supplying the pressure oil to the hydraulic chamber 231 of the lockup switching valve 213 is caused to communicate with the port 214b of the first electromagnetic valve 214, or the oil path for directly supplying the secondary pressure PL2 by the switching valve 215 controlled by the second electromagnetic valve 217. Due to that, the pressure oil supplied from the first electromagnetic valve 214 to be controlled in proportion to a duty may be caused to act on the hydraulic chamber 231 of the lockup switching valve 213 in realizing the lockup state or slip state described above, and the secondary pressure PL2 may be caused to act on the hydraulic chamber 231 regardless of the first electromagnetic valve 214 in releasing the lockup state quickly. Thereby, the oil path opening area of the first electromagnetic valve 214 need not be enlarged and the first electromagnetic valve 214 may be miniaturized. Accordingly, the third embodiment has an effect that the pressure regulating precision of the first electromagnetic valve 214 to be controlled in proportion to a duty is enhanced by reducing the oil path opening area of the first electromagnetic valve 214.

Further, according to the lockup control system of the third embodiment, the switching valve 215 is controlled by the second electromagnetic valve 217, regardless of the control state of the first electromagnetic valve 214. Thereby, there is an effect that the lockup state may be released by the second electromagnetic valve 217 even when the first electromagnetic valve 214 becomes uncontrollable. Accordingly, there is an effect that safety of the system is improved.

Further, according to the lockup control system of the third embodiment, a spool valve provided to inhibit a lockup, in the first or second gear position for example, may be applied since the switching valve 215 is a spool valve. Thereby, there is an effect that parts cost may be lowered and the lockup control system may be miniaturized. Further, a flow amount of the pressure oil flowing through the switching valve 215 may be increased by increasing a diameter of the switching valve 215 which is the spool valve. Thereby, a large flow amount of pressure oil may be readily supplied to the hydraulic chamber 231 of the lockup switching valve 213 just by increasing the diameter of the switching valve 15. Accordingly, there is an effect that the lockup state may be quickly released even more.

What is claimed is:

1. A lockup control system for an automatic transmission, comprising:

a fluid joint for transmitting a rotary motive power from an input shaft to an output shaft through a fluid;

a lockup clutch mechanism for linking said input and output shafts by bypassing said fluid joint, said lockup clutch mechanism having a fluid chamber which controls closed and open states of said lockup clutch mechanism in response to hydraulic pressure introduced therein;

a duty-controlled electromagnetic valve for controlling a control hydraulic pressure so as to switch said closed and open states of said lockup clutch mechanism; and a directional control valve switched between first and second states thereof in response to said control hydraulic pressure controlled by said duty-controlled electromagnetic valve, said directional control valve forming a first hydraulic path for providing a predetermined hydraulic pressure to said fluid chamber to open said lockup clutch mechanism in said first state of said directional control valve and a second hydraulic path for providing said control hydraulic pressure to said fluid chamber to close said lockup clutch mechanism in said second state of said directional control valve.

2. The lockup control system for the automatic transmission according to claim 1, wherein said control hydraulic pressure is lower than said predetermined hydraulic pressure provided to said first hydraulic path in said first state of said directional control valve, is set by said duty-controlled electromagnetic valve, and is provided to said fluid chamber through said second hydraulic path in said second state of said directional control valve.

3. The lockup control system for the automatic transmission according to claim 2 wherein said directional control valve is provided with first and second hydraulic chambers at both ends of a valve member thereof, said control hydraulic pressure having a first pressure, from said control valve, is supplied to said first hydraulic chamber, a preset hydraulic pressure having a second pressure is supplied to said second hydraulic chamber, and said directional control valve is set in said second state when said first pressure is lower than said second pressure.

4. The lockup control system for the automatic transmission according to claim 1, further comprising:

a restrictor being provided between said second hydraulic chamber and a hydraulic source of said second pressure.

5. The lockup control system for the automatic transmission according to claim 4, further comprising:

a check valve being provided in parallel with said restrictor.

6. A lockup control system for an automatic transmission, comprising:

a fluid joint for transmitting a rotary motive power from an input shaft to an output shaft through a fluid;

a lockup clutch mechanism for linking said input and output shafts by bypassing said fluid joint;

a switching valve for switching supply and discharge of pressurized fluid to said fluid joint and said lockup clutch mechanism; and a control valve for controlling a closed state of said lockup clutch mechanism by controlling a hydraulic pressure supplied to said lockup clutch mechanism, said hydraulic pressure being controlled by said control valve, and being supplied to said switching valve to switch said switching valve into a supply state, and also being supplied to said lockup control mechanism through said switching valve.

7. The lockup control system for the automatic transmission according to claim 6, wherein said lockup clutch mechanism comprises a clutch control pressure fluid chamber which is concealed when said lockup clutch mechanism is closed, and said control valve controls said hydraulic pressure in said clutch control pressure fluid chamber.

8. A lockup control system for an automatic transmission, comprising:

a fluid joint for transmitting a rotary motive power from an input shaft to an output shaft through a fluid;

a lockup clutch mechanism for linking said input and output shafts by bypassing said fluid joint;

a first directional control valve for supplying/discharging pressure oil for switching closed state and released state of said lockup clutch mechanism;

a first control valve for supplying/discharging pressure oil for operating said first directional control valve and for supplying a controlled hydraulic pressure to said lockup clutch mechanism via said first switching valve;

a second directional control valve for switching a communication state in which an oil path which connects said first directional control valve and said first control valve is caused to communicate and a shut-off state in which said oil path is shut off and pressure oil is supplied to the oil path on the side of said first directional control valve to release said lockup clutch mechanism; and a second control valve for supplying/discharging pressure oil for causing said second directional control valve to put into the shut-off state.

9. The lockup control system for the automatic transmission according to claim 8 wherein said second control valve is a duty-proportional control valve whose ON/OFF is controlled on the basis of a control command sent from an electronic control unit.

10. The lockup control system for the automatic transmission according to claim 8 wherein said first control valve is a duty-proportional control valve whose ON/OFF is controlled on the basis of a control command sent from the electronic control unit.

11. The lockup control system for the automatic transmission according to claim 8 wherein said second directional control valve is a spool valve.

12. A lockup control system for an automatic transmission, comprising:

a hydraulic pressure source for generating a predetermined hydraulic pressure;

a fluid joint for transmitting a rotary motive power from an input shaft to an output shaft through a fluid;

a lockup clutch mechanism for linking said input and output shafts by bypassing said fluid joint;

a control valve for generating a constant hydraulic pressure when deactivated and for generating a control hydraulic pressure which is lower than said constant hydraulic pressure when activated; and a directional control valve switched to a first state in response to said constant hydraulic pressure generated by said control valve, for releasing a linkage of said lockup clutch mechanism by supplying a predetermined hydraulic pressure to said lockup clutch mechanism therethrough, and switched to a second state in response to said control hydraulic pressure, for forming said linkage of said lockup clutch mechanism by supplying said control hydraulic pressure to said lockup clutch mechanism therethrough.

13. The lockup control system for the automatic transmission according to claim 12, further comprising:

hydraulic pressure control valve means for forcibly switching said directional control valve to said first state by supplying said constant hydraulic pressure to said directional control valve regardless of whether said control valve generates said control hydraulic pressure.

14. The lockup control system for the automatic transmission according to claim 13, wherein said hydraulic pressure control valve means comprises:

a switching valve disposed between said directional control valve and said control valve and having a first state in which said control hydraulic pressure from said control valve is supplied to said directional control valve and a second state in which said constant hydraulic pressure is supplied to said directional control valve; and a second control valve for controlling a second control hydraulic pressure supplied to said switching valve in order to switch said switching valve to one of said first and second states.

* * * * *